United States Patent
McGee et al.

(10) Patent No.: US 7,196,493 B2
(45) Date of Patent: Mar. 27, 2007

(54) CLOSED LOOP CONTROL OF BATTERY POWER LIMITS BASED ON VOLTAGE

(75) Inventors: Ryan McGee, Ann Arbor, MI (US); Jonathan Butcher, Dearborn, MI (US); John Czubay, Troy, MI (US); Fazal Syed, Canton, MI (US); Ming Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 10/710,759

(22) Filed: Jul. 30, 2004

(65) Prior Publication Data
US 2006/0022642 A1 Feb. 2, 2006

(51) Int. Cl.
*H02J 7/00* (2006.01)
*H02J 7/14* (2006.01)

(52) U.S. Cl. ............... 320/104; 320/134; 320/132; 320/149

(58) Field of Classification Search ........... 320/132, 320/134, 149; 307/10.7, 9.1
See application file for complete search history.

(56) References Cited

U.S. PATENT DOCUMENTS

| | | | |
|---|---|---|---|
| 5,285,111 A | 2/1994 | Sherman | |
| 5,343,970 A | 9/1994 | Severinsky | |
| 5,619,417 A * | 4/1997 | Kendall | 702/63 |
| 5,637,987 A | 6/1997 | Fattic et al. | |
| 5,939,861 A * | 8/1999 | Joko et al. | 320/122 |
| 6,208,034 B1 | 3/2001 | Yamaguchi | |
| 6,269,290 B1 | 7/2001 | Egami et al. | |
| 6,344,732 B2 * | 2/2002 | Suzuki | 320/132 |
| 6,364,807 B1 | 4/2002 | Koneda et al. | |
| 6,456,041 B1 * | 9/2002 | Terada et al. | 320/132 |
| 2005/0077867 A1 * | 4/2005 | Cawthorne et al. | 320/104 |

* cited by examiner

*Primary Examiner*—Gary L. Laxton
*Assistant Examiner*—Alexis Boateng
(74) *Attorney, Agent, or Firm*—David B. Kelley; Brooks & Kushman

(57) ABSTRACT

A controller and a control method for modifying battery discharge and charge power limits in a vehicle powertrain that includes an electric battery as a power source. The modification compensates for inaccurate estimates of battery discharge and charge power limits by using a closed loop feedback control based on error between a battery voltage set point and commanded battery voltage.

17 Claims, 5 Drawing Sheets

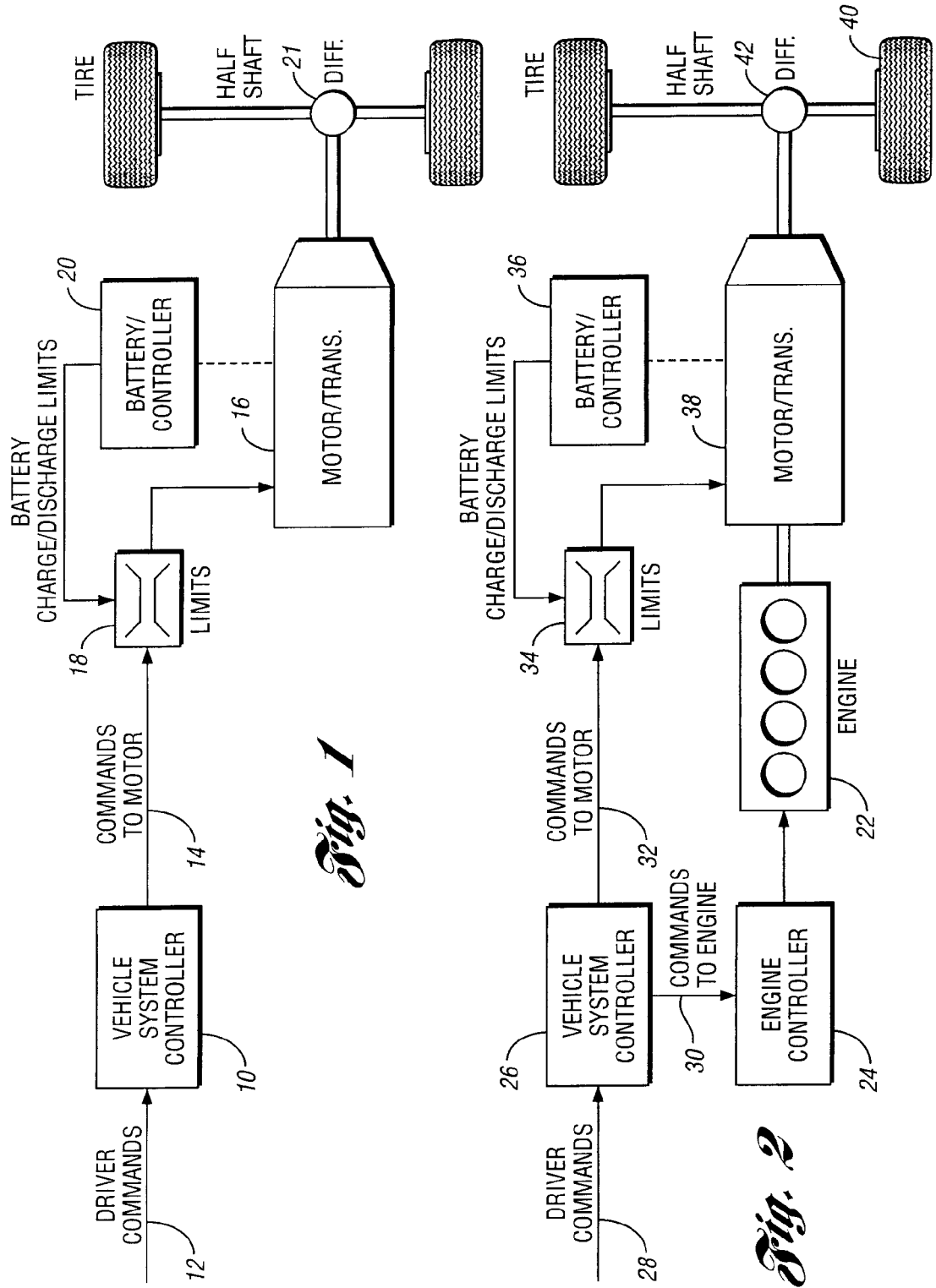

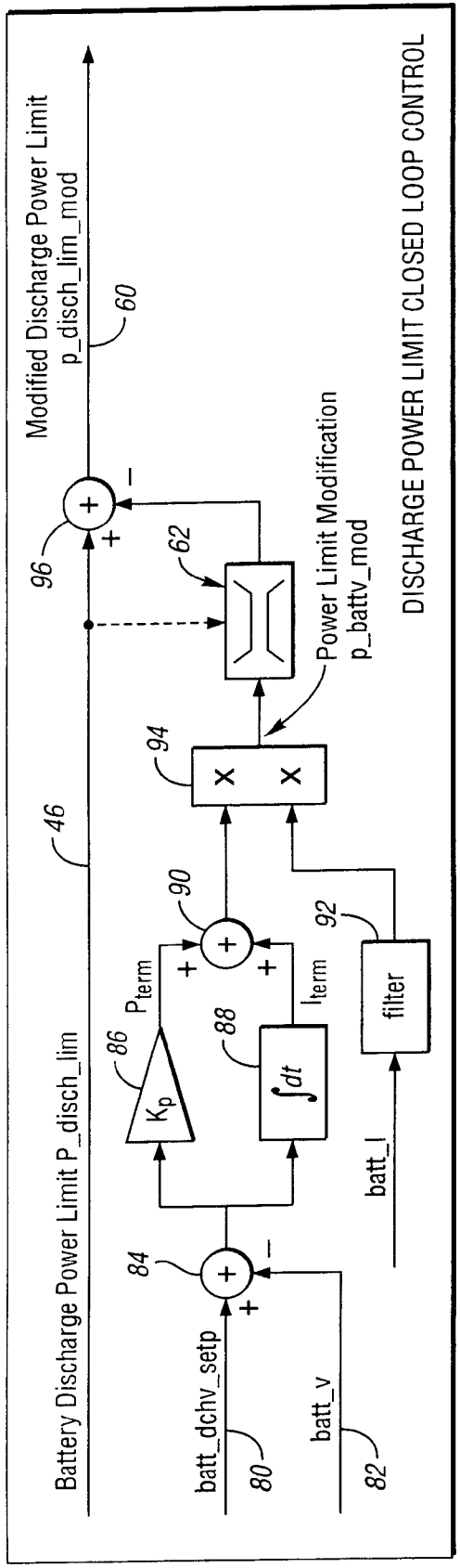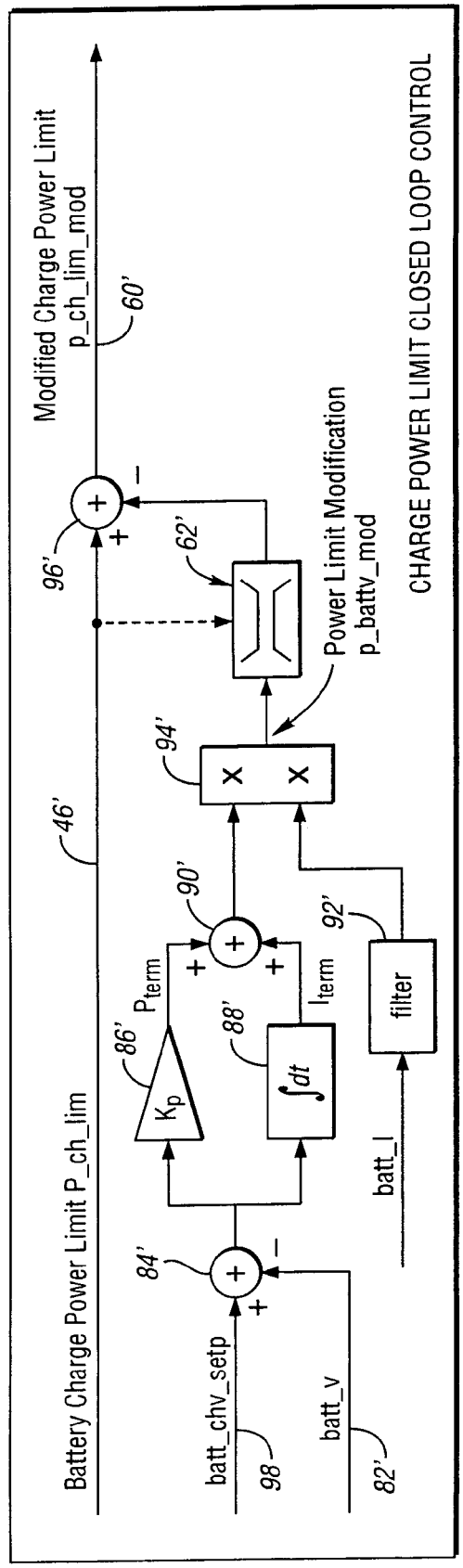

CLOSED LOOP CONTROL OF BATTERY POWER LIMITS BASED ON VOLTAGE

BACKGROUND OF INVENTION

1. Field of the Invention

The invention relates to hybrid electric vehicle powertrains having an internal combustion engine and an electric drive system with an electric motor, a generator and a battery. It relates also to pure electric vehicle powertrains having an electric motor, a generator and a battery defining an electromechanical power flow path.

2. Background Art

Hybrid electric vehicle powertrains and pure electric vehicle powertrains use a battery and an electric motor to establish a power flow path to vehicle traction wheels. In the case of a hybrid electric vehicle, an internal combustion engine complements the electric motor and the battery by establishing an independent power flow path to the vehicle traction wheels.

One class of hybrid electric vehicles, commonly referred to as a parallel hybrid electric vehicles, includes a powertrain with two power source configurations. The first configuration comprises an engine, a motor, a generator with a battery, and a planetary gearset for coordinating power distribution to traction wheels. A second power source configuration in a parallel hybrid electric powertrain includes an electric drive system with only a motor, a generator and a battery. The battery acts as an energy storing device for the generator and the motor.

The two power source configurations work together seamlessly with the planetary gearset to meet the driver's demand for power as much as possible without exceeding power limits of the powertrain and power limits of the battery subsystem. Under normal operating conditions, a vehicle system controller interprets the driver's demand for power as a function of acceleration or deceleration. The controller will determine how much torque each power source needs to contribute to total power demanded by the driver and to achieve specified vehicle performance (i.e., engine fuel economy, emission quality, driveability, etc.).

The power supplied by the two power sources is coordinated by the vehicle system controller as it meets the driver's demand for power without exceeding the limits of the system and without exceeding the battery voltage limits during either charging or discharging.

The powertrain will determine the driver's demand for torque and achieve optimum division of power between the two power sources without exceeding battery power limits. If the battery limits are exceeded and the battery voltage is outside of a specified precalibrated range, the controller will shut down the vehicle. This condition can be avoided using a closed loop power control as described in co-pending patent application Ser. No. 10/248,886, filed Feb. 27, 2003 entitled "Closed Loop Power Control System for Hybrid Electric Vehicles." This co-pending application is assigned to the assignee of the present invention. Reference is made to it to complement the present disclosure. It is incorporated in this disclosure by reference.

In a conventional vehicle powertrain with a gasoline engine, combustion energy availability is the same under all operating conditions regardless of the amount of gasoline in the vehicle gas tank. In contrast, the energy availability in a hybrid electric vehicle powertrain or in a pure electric vehicle powertrain depends upon battery conditions (e.g., battery state of charge and battery temperature). A power command to the electric motor in a hybrid electric vehicle or in a pure electric vehicle therefore is limited by the battery power availability.

Accuracy in establishing the battery power limits is needed to maintain the battery voltage within a certain range to ensure that the powertrain system will function properly. Accuracy of the battery limits is needed also to avoid shutdown of the electric motor and its controller due to a voltage that is under or over the battery voltage limits. It is possible, however, for the battery controller to inaccurately estimate the battery's discharge and charge power limits, especially in view of the complexity of electro chemistry of the battery. An inaccurate estimation of the battery power limits could cause the battery voltage to be out of a precalibrated proper range.

SUMMARY OF AN EMBODIMENT OF THE INVENTION

The disclosed embodiment comprises a closed loop control system and method for modifying precalibrated battery limits when necessary for any given powertrain power demand. The control system compensates for inaccuracy in the estimation of the battery power limits by the battery controller so that a potential vehicle shut down can be avoided.

Battery voltage set points, which define upper and lower voltage boundaries, are established by calibration. The control system uses actual battery voltages as a feedback signal to create a modification to the battery power limits. The modification is determined by a voltage closed loop control system if the actual battery voltage is higher or lower than the boundaries established by the battery voltage set points. If the battery voltage is within the boundary, the control system will not change the battery power limits.

The method of the disclosed embodiment of the invention includes computing an estimated battery power limit during battery discharge and battery charge. Commanded electric battery power is compared to an estimated battery power limit. A modified battery power limit is computed if actual battery voltage exceeds the battery charge or discharge voltage limit.

BRIEF DESCRIPTION OF DRAWINGS

FIG. 1 shows an electric vehicle powertrain in which an electric motor, such as a high voltage induction motor, is the sole power source;

FIG. 2 is a schematic representation of a hybrid electric vehicle powertrain in which an internal combustion engine and an electric motor establish separate power flow paths to vehicle traction wheels;

FIG. 4*a* is a PI controller subsystem for the control system illustrated in FIG. 3 during battery discharge;

FIG. 4*b* is a PI controller subsystem for the control system illustrated in FIG. 3 during battery charge;

DETAILED DESCRIPTION

Figure 3:
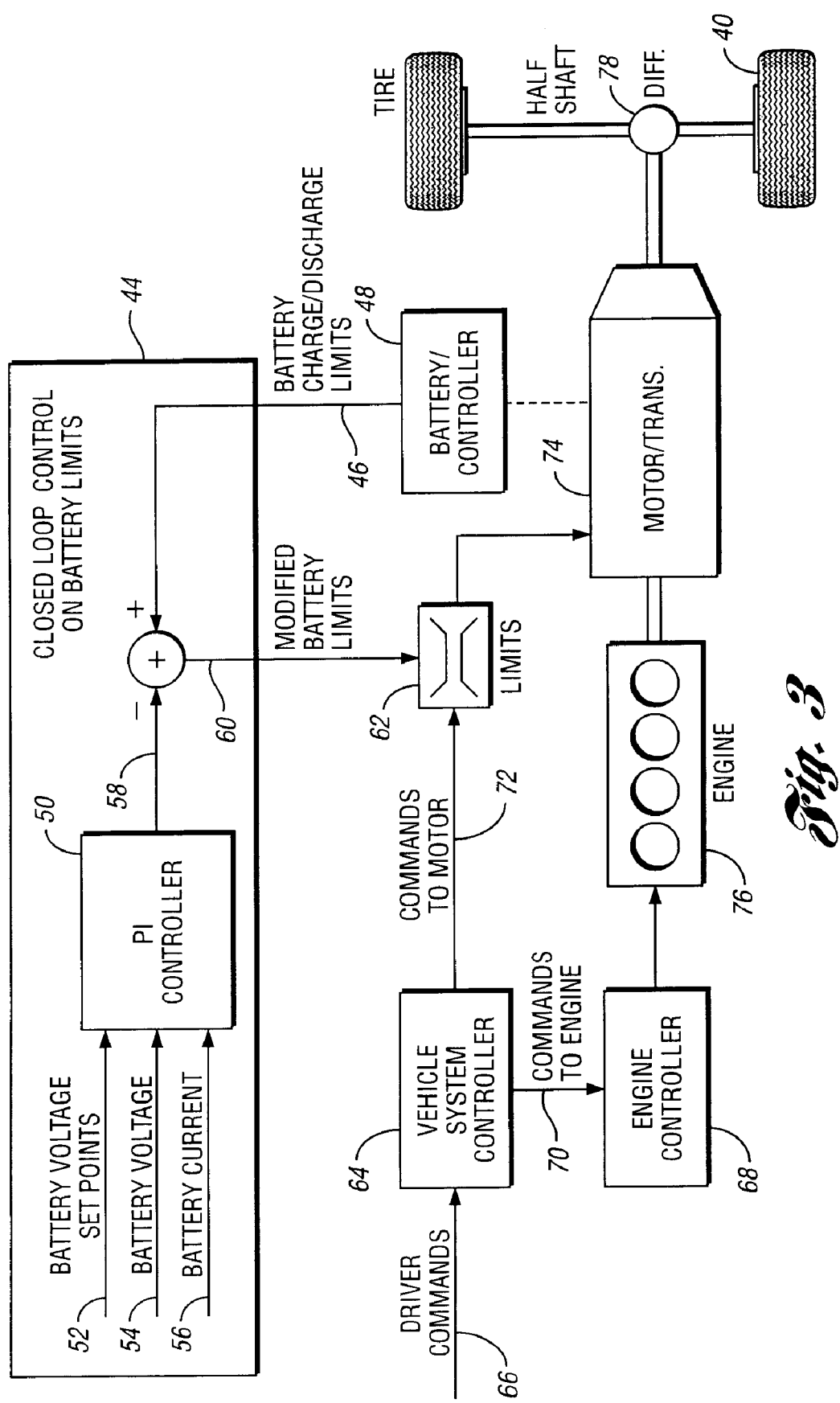
FIG. 3 is a schematic illustration of a closed loop control for battery limits as applied to a hybrid electric vehicle powertrain.

The powertrain of FIG. 1 has a vehicle system controller 10 that receives driver commands for power at 12. The controller will issue commands at 14 to the motor and transmission 16, which in turn delivers power to the vehicle traction wheels through a geared differential and half shaft assembly 21. The commands at 14 are tested by a comparator 18. Before the commands are issued to the motor and transmission assembly 16, the comparator determines whether limits established by battery controller 20 are either above or below the command at 14.

FIG. 2 shows a hybrid electric vehicle powertrain which includes an internal combustion engine 22 under the control of an engine controller 24. Vehicle system controller 26 responds to driver commands at 28 to issue commands at 30 to the engine controller 24. It issues commands also to the motor, as shown at 32. As in the case of the pure electric powertrain of FIG. 1, the commands to the motor are tested at comparator 34 to determine whether the command at 32 is within the battery charge and discharge limits established by battery controller 36.

The power flow path established by the motor and transmission assembly 38 and by the engine 22 is delivered to the traction wheels 40 through a differential half shaft assembly 42.

FIG. 3 shows an embodiment of the invention wherein a closed loop controller 44 receives battery charge and discharge limits at 46, which are established by a battery and battery controller 48. The closed loop control 44 includes a PI (proportional-integral) controller 50. Input variables for the controller 50 are battery voltage set points at 52, battery voltage at 54 and battery current at 56. As will be described subsequently, the controller 50 establishes an increment or a decrement in the battery power limits for a given set of operating conditions. This is shown at 58. The changes are added to or subtracted from the battery charge or discharge limits at 46 to produce modified battery limits at 60. Those modified battery limits are transferred to the comparator 62, which corresponds to the comparator 34 of FIG. 2 and the comparator 18 of FIG. 1.

The vehicle system controller 64 of FIG. 3 corresponds to the vehicle system controller 26 of FIG. 2 and 10 of FIG. 1. It receives driver commands at 66 and issues engine commands to engine 68 as shown at 70. As in the case of the configuration of FIG. 2, controller 64 issues commands to the motor as shown at 72, the motor being a part of the motor and transmission assembly 74. The motor of the assembly 74 and engine 76 are power sources in power flow paths to a differential and axle half shaft assembly 78.

Although FIG. 3 shows a hybrid electric vehicle powertrain of the type shown in FIG. 2, the closed loop control 44 of FIG. 3 could be used as well with a pure electric vehicle powertrain of the type shown in FIG. 1.

The closed loop control for the battery power limits shown at 44 in FIG. 3 is illustrated in detail in FIG. 4a for a battery discharge power limit control. FIG. 4b is a schematic view, similar to FIG. 4a, which shows a closed loop control for regulating battery charge power limits.

In FIGS. 4a and 4b, the battery limits are the battery discharge and charge power limits, respectively, and the sign convention for the battery power load (discharge or charge) is as follows: discharging is positive and charging is negative. Battery discharge power limit, therefore, is a positive value, while the battery charge power limit is a negative value. Positive battery current means discharging, and negative battery current means charging.

In FIG. 4a, a battery discharge set point, which is established during calibration, is indicated at 80. The actual battery voltage at any given instant is indicated at 82. The actual battery voltage is subtracted from the set point value at summing junction 84. A PI (proportional-integral) controller includes a proportional term ($P_{term}$) calculation at 86. An integral term ($I_{term}$) calculation occurs at 88. The PI controller may be of any type generally known in the art.

Figure 5:
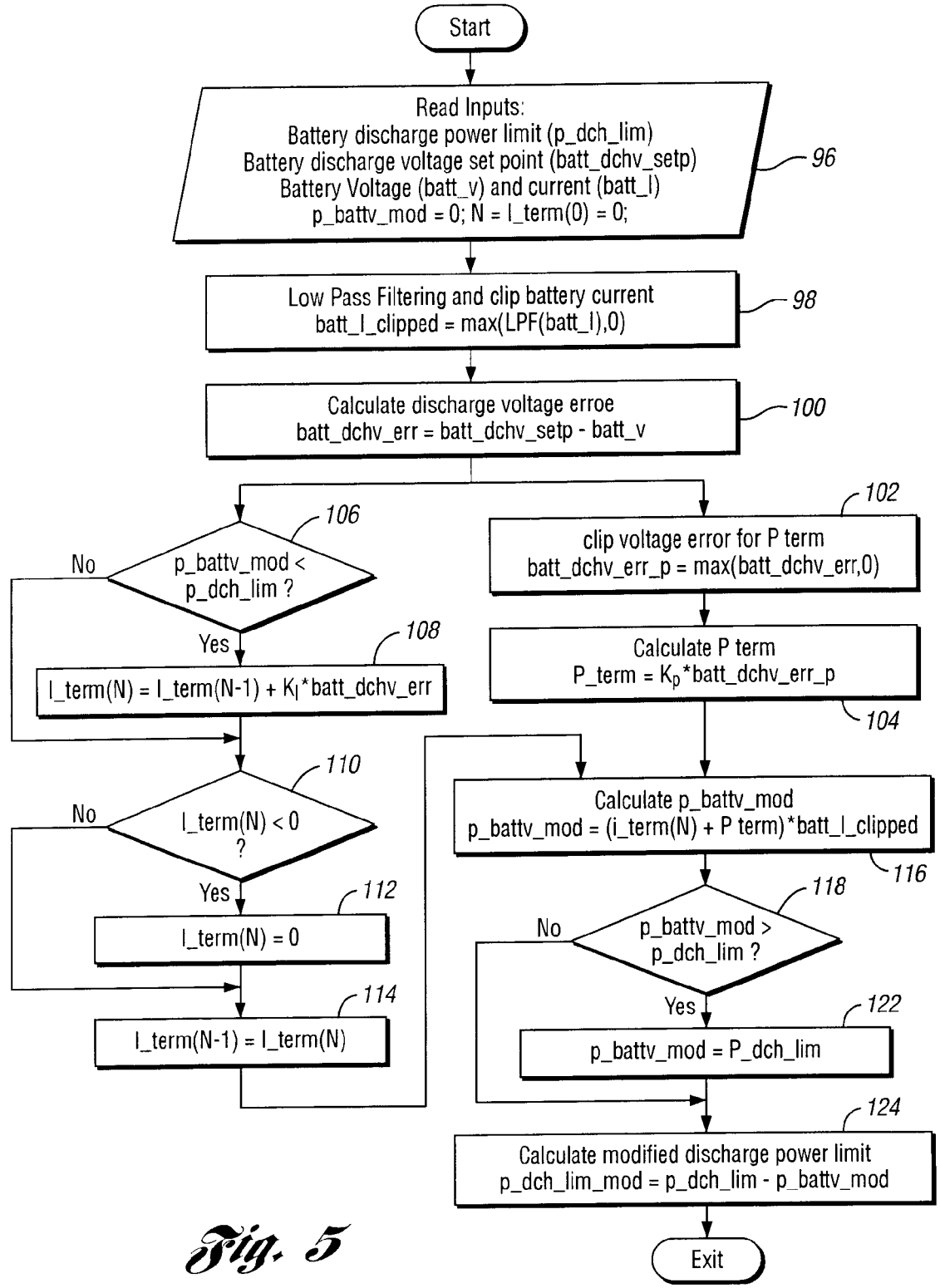
FIG. 5 is a flowchart of a control algorithm for calculating a modified battery discharge power limit.
Figure 6:
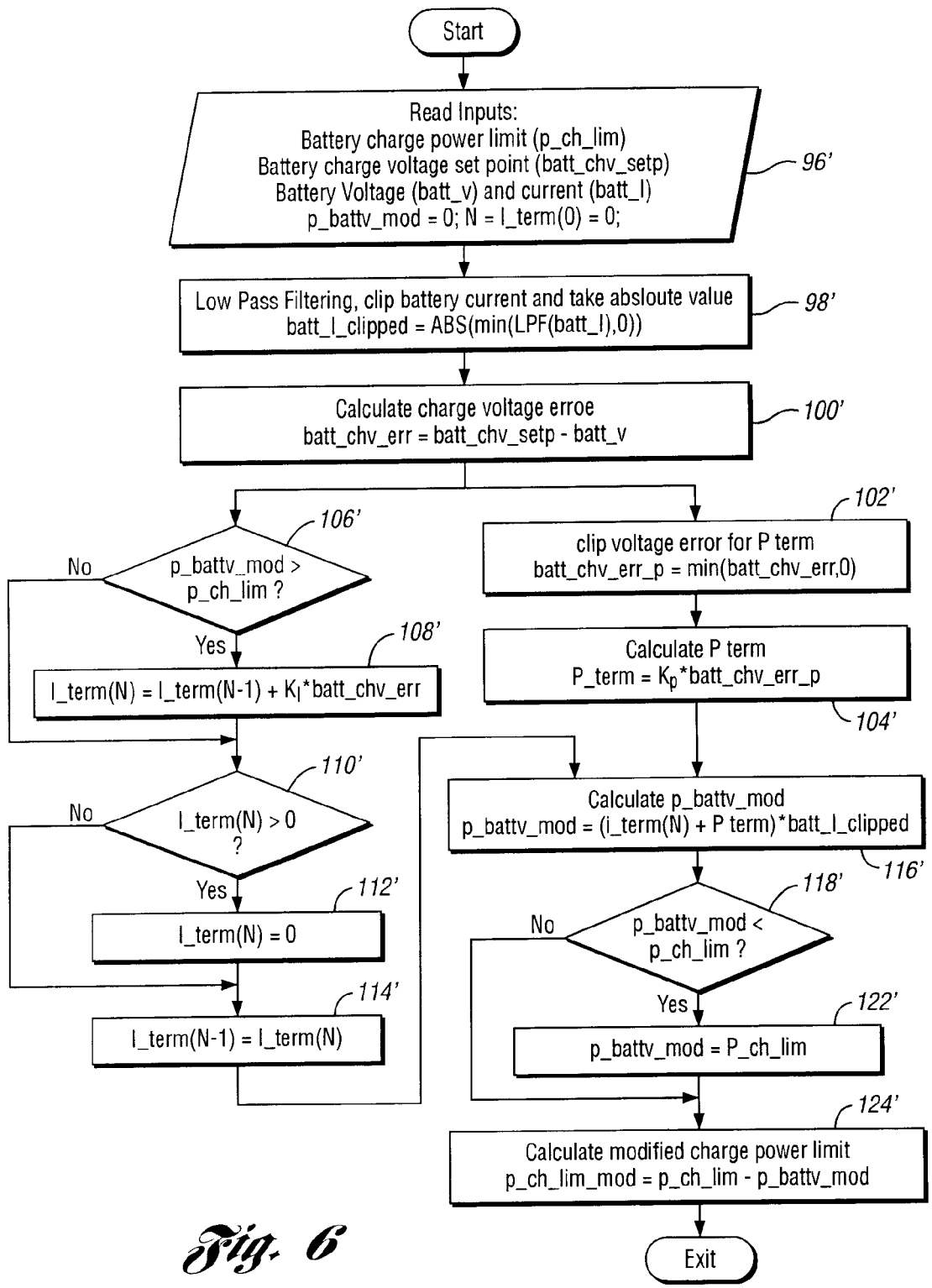
FIG. 6 is a flowchart of a control algorithm for calculating a modified battery charge power limit.

The $P_{term}$ is added to the $I_{term}$ at junction 90. The sum of the $P_{term}$ and the $I_{term}$ is multiplied by a filtered battery current at 92. The product of the voltage value at 90 and the value of the current at 92 is the power limit modification determined at 94, which is tested at 62 to determine whether it is above or below the discharge power limit at 46. The power limit modification, which will be described with respect to the flowcharts of FIGS. 5 and 6, is added to or subtracted from the battery power discharge power limit at 46. This occurs at summing junction 96, thereby producing a modified discharge power limit 60.

Unlike FIG. 4a, FIG. 4b shows a comparison of the charge voltage boundary at 98 rather than a discharge voltage boundary at 80. The actual battery voltage at 82' is subtracted from the voltage at 98. The difference is transferred to a proportional-integral (PI) controller corresponding to the PI controller of FIG. 4a.

The elements of the PI controller of FIG. 4b corresponding to the elements of the PI controller of FIG. 4a have been designated by similar reference numerals, although prime notations are added. In the case of FIG. 4b, the modified charge power limit is shown at 60'. In FIG. 4a, the modified charge power limit is shown at 60. These modified power limits are tested at 62, as described with respect to FIG. 3, to determine whether the discharge or charge limits are exceeded.

FIG. 5 shows a flowchart of an algorithm for determining a discharge power limit using closed loop control. The controller reads input variables at 96. These variables include battery discharge power limit, battery discharge voltage set point, battery voltage and battery current. Also, the battery voltage limit modification and the integral term for the PI controller is set to zero. The index run number for the closed loop is set to one.

At action block 98, a battery current is filtered using a low pass filter. The filter time constant can be varied depending upon the noise level of the signal. The battery current is clipped to a value greater than or equal to zero.

The next step in the routine indicated at 100 involves a calculation of the discharge voltage error. This was seen at 84 and 84' in FIGS. 4a and 4b, respectively.

Having determined the discharge voltage error, the integral term and the proportional term for the PI controller of FIG. 4a are calculated. In the calculation of the proportional term, the voltage error is clipped at action block 102. The error signal is clipped to positive values so that the proportional term only modifies the battery discharge limit if the voltage is below the set point. The $P_{term}$ then is calculated at action block 104 by multiplying the clipped error signal by the proportional gain $K_P$.

In the calculation of the $I_{term}$, it is first determined at decision block 106 whether the battery voltage limit modification is greater than the battery discharge power limit. If it is greater, the $I_{term}$ is not updated. This will prevent further increases in the $I_{term}$ by freezing the integrator and preventing the integrator from winding up (increasing the value of the $I_{term}$). If the battery limit modification is not greater than the battery discharge power limit, the $I_{term}$ is updated at action block 108. This is done by adding the $I_{term}$ for the previous control loop to the product of the integration constant and the voltage error determined at 84 and 84' in FIGS. 4a and 4b, respectively. If the present $I_{term}$ becomes negative as shown at decision block 110, the $I_{term}$ is reset to zero at action block 112. The previous $I_{term}$ is stored at 114 and reset to the present $I_{term}$.

Having determined the $P_{term}$ and the $I_{term}$, the power limit modification is calculated at action block 116. Power limit modification is the sum of the proportional and integral terms multiplied by the clipped and filtered battery current. The battery current is low pass filtered with a calibratable filter time constant. This will allow the same PI controller with the same PI gains to be used when the internal battery resistance is higher (e.g., when the battery temperature is low).

If the battery power limit modification is less than the power discharge limit, as determined at decision block 118, the modified power discharge limit is calculated at action block 124. This is done by subtracting the power limit modification from the discharge power limit. If the battery power limit modification is greater than the battery discharge power limit, as determined at decision block 118, the battery power limit modification is equal to the battery power discharge limit at action block 122. The routine then proceeds to action block 124 where the modified discharge power limit is calculated, as explained previously.

FIG. 6 is a flowchart illustrating the controller routine for a closed loop controlled battery charge power limit. The routine is similar to the routine of FIG. 5. The steps in the routine of FIG. 6 have been identified by reference numerals that correspond to the reference numerals used in FIG. 5, although prime notations are used. In the case of the routine of FIG. 6, the inputs that are read by the controller at the beginning of the routine are battery charge power limit, battery charge voltage set point, battery voltage and battery current. In step 98', the battery current is low pass filtered and clipped. The absolute value of the clipped current is used. The end result of the routine of FIG. 6 is the calculation of modified charge power limit rather than a calculation of modified discharge power limit, as in the case of the flowchart of FIG. 5.

Both during charging and discharging of the battery, the embodiment of the invention described above is capable of compensating for inaccuracy of the battery limits estimated by the battery controller.

Although an embodiment of the invention has been described, it will be apparent to a person skilled in the art that modifications may be made without departing from the scope of the invention. All such modifications and equivalents thereof are intended to be covered by the following claims.

The invention claimed is:

1. A method for controlling battery discharge power limits for an electric battery in a vehicle powertrain, the battery being a source of power for an electric motor, the battery having a calibrated voltage set point that defines a limit for battery discharge voltage, the method comprising:
    measuring actual battery current;
    measuring an error between the battery discharge voltage set point and the actual battery voltage using the actual voltage in a voltage closed loop feedback control;
    determining a battery discharge power limit;
    computing a voltage proportional term and a voltage integral term based on the error; and
    multiplying the sum of the proportional term and the integral term by the actual battery current to obtain a power limit modification thereby preventing a battery discharge voltage in excess of the battery discharge set point.

2. A method for controlling battery charge power limits for an electric battery in a vehicle powertrain having an electric battery as a source of power for an electric motor, the battery being a source of power for an electric motor, the battery having a calibrated voltage set point that defines a limit for battery charge voltage, the method comprising:
    measuring an error between the battery charge voltage set point and actual battery voltage using actual voltage in a voltage closed loop feedback control;
    determining a battery charge power limit;
    computing a voltage proportional term and a voltage integral term based on the error;
    measuring actual battery current; and
    multiplying the sum of the proportional term and the integral term by the actual battery current to obtain a power limit modification thereby preventing a battery charge voltage in excess of the battery charge set point.

3. The method set forth in claim 1 wherein the step of measuring actual battery current includes filtering the battery current with a low pass filter with a filter time constant that can be varied depending on noise level.

4. The method set forth in claim 2 wherein the step of measuring actual battery current includes filtering the battery current with a low pass filter with a filter time constant that can be varied depending on noise level.

5. A control system for a battery power limit in a vehicle powertrain in which a battery is a vehicle power source comprising:
    a battery controller;
    a motor driveably connected to a power output, the motor being electrically coupled to the battery controller;
    a vehicle system controller for receiving driver commands and delivering control commands to the motor;
    a proportional-integral controller with a battery voltage set point input, a battery voltage input and a battery current input;
    a comparator communicating with the vehicle system controller and the proportional-integral controller whereby battery power limits are compared to power limits established by the battery controller;
    the vehicle system controller being configured to develop battery power commands in response to driver commands; and
    a power limit closed loop control communicating with the proportional-integral controller and with the battery whereby a power limit for the battery is modified to maintain battery voltage at a value that does not exceed the battery voltage set point.

6. The control system set forth in claim 5 wherein the battery voltage set point is a battery discharge voltage set point.

7. The control system set forth in claim 5 wherein the battery voltage set point is a battery charge voltage set point.

8. The method set forth in claim 1 wherein the measured actual battery current is clipped during discharge to values greater than or equal to zero.

9. The method set forth in claim 8 wherein the error is clipped to positive values whereby the proportional term modifies the battery discharge power limit only if the actual voltage is below the discharge voltage set point.

10. The method set forth in claim 9 wherein the clipped error signal is multiplied by a proportional gain to compute the proportional term.

11. The method set forth in claim 1 wherein the integral term is prevented from increasing if the power limit modification is greater than the limit for battery discharge voltage.

12. The method set forth in claim 11 wherein the integral term is reset to zero if the integral term becomes negative.

13. The method set forth in claim 1 wherein the measured actual battery current is clipped during charging to values less than or equal to zero and absolute values are used.

14. The method set forth in claim 13 wherein the error is clipped to negative values whereby the proportional term modifies the battery charge power limit only if the actual voltage is below the charge voltage set point.

15. The method set forth in claim 14 wherein the clipped error signal is multiplied by a proportional gain to compute the proportional term.

16. The method set forth in claim 1 wherein the integral term is prevented from increasing if the power limit modification is less than the limit for battery charge voltage.

17. The method set forth in claim 16 wherein the integral term is reset to zero if the integral term becomes positive during battery charging.

* * * * *